United States Patent
Wang et al.

(10) Patent No.: US 11,335,098 B2
(45) Date of Patent: May 17, 2022

(54) DATA PROCESSING METHODS, APPARATUSES AND STORAGE MEDIA

(71) Applicant: Beijing Sensetime Technology Development Co., Ltd., Beijing (CN)

(72) Inventors: Xuecheng Wang, Beijing (CN); Lingfeng Pan, Beijing (CN); Chen Chen, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/090,179

(22) Filed: Nov. 5, 2020

(65) Prior Publication Data

US 2021/0097296 A1    Apr. 1, 2021

Related U.S. Application Data

(63) Continuation of application No. PCT/CN2020/098970, filed on Jun. 29, 2020.

(30) Foreign Application Priority Data

Sep. 29, 2019    (CN) .......................... 201910932122.7

(51) Int. Cl.
*G06V 40/10* (2022.01)
*G06V 20/52* (2022.01)
(Continued)

(52) U.S. Cl.
CPC .............. *G06V 20/52* (2022.01); *G06V 20/46* (2022.01); *G06V 40/10* (2022.01); *G06V 40/172* (2022.01)

(58) Field of Classification Search
CPC ........... G06K 9/00744; G06K 9/00778; G06K 9/00771; G06K 9/00288; G06K 9/00362;
(Continued)

(56) References Cited

U.S. PATENT DOCUMENTS

| 9,237,379 B2 | 1/2016 | Lee | |
|---|---|---|---|
| 2007/0171296 A1* | 7/2007 | Tsukiji | G06V 40/166 348/E5.045 |

(Continued)

FOREIGN PATENT DOCUMENTS

| CN | 105608419 A | 5/2016 | |
|---|---|---|---|
| CN | 106650695 A * | 5/2017 | G06K 9/00778 |

(Continued)

OTHER PUBLICATIONS

Office Action Issued in Taiwan Application No. 109133380, dated May 27, 2021, 18 pages.
(Continued)

*Primary Examiner* — Syed Haider

(57) ABSTRACT

Examples of the present disclosure disclose data processing methods, apparatuses and storage media. The data processing method includes: obtaining a plurality of video images of a target site within a predetermined time range; performing pedestrian identification processing on the plurality of video images to obtain, based on the identification result, a customer counting result for a first region in the target site and a customer counting result for a second region in the target site; and determining a degree of association between the second region and the first region based on the customer counting result for the first region and the customer counting result for the second region.

18 Claims, 3 Drawing Sheets

(51) Int. Cl.
*G06V 20/40* (2022.01)
*G06V 40/16* (2022.01)

(58) Field of Classification Search
CPC ........ G06V 20/52; G06V 20/53; G06V 40/10; G06V 40/172; G06V 20/46
See application file for complete search history.

(56) References Cited

U.S. PATENT DOCUMENTS

2017/0006258 A1\* 1/2017 Farrell .................. H04L 67/303
2019/0318491 A1\* 10/2019 Laganiere ............... G06T 7/521

FOREIGN PATENT DOCUMENTS

| | | | |
|---|---|---|---|
| CN | 106650695 A | | 5/2017 |
| CN | 107832890 A | | 3/2018 |
| CN | 108038176 A | \* | 5/2018 |
| CN | 108038176 A | | 5/2018 |
| CN | 107644218 B | | 12/2018 |
| CN | 109447114 A | \* | 3/2019 |
| CN | 109447114 A | | 3/2019 |
| JP | 2007304983 A | | 11/2007 |
| JP | 2010072723 A | | 4/2010 |
| JP | 2018097628 A | | 6/2018 |

OTHER PUBLICATIONS

Japanese Patent Office Action, Office Action Issued in Application No. 2020-564902, dated Jan. 13, 2022, 16 pages.

\* cited by examiner

DATA PROCESSING METHODS, APPARATUSES AND STORAGE MEDIA

CROSS-REFERENCE TO RELATED APPLICATION

The present disclosure is a continuation of International Application No. PCT/CN2020/098970, filed on Jun. 29, 2020, which claims priority of Chinese Patent Application No. 201910932122.7 filed on Sep. 29, 2019, the entire content of all of which is incorporated herein by reference.

TECHNICAL FIELD

The present disclosure relates to the field of computer vision technology, in particular to a data processing method, apparatus and storage medium.

BACKGROUND

There are many different types of stores in shopping sites such as large shopping malls and supermarkets. The layout of stores will affect the shopping experience of customers, store entry rates and sales. Therefore, how to determine the association between stores and perform store layout is of great significance to shopping sites.

SUMMARY

Examples of the present disclosure provide a technical solution for a data processing method.

In the first aspect, the examples of the present disclosure provide a data processing method, which includes: obtaining a plurality of video images of a target site within a predetermined time range; performing pedestrian identification processing on the plurality of video images to obtain, based on the identification result, a customer counting result for a first region in the target site and a customer counting result for a second region in the target site; and determining a degree of association between the second region and the first region based on the customer counting result for the first region and the customer counting result for the second region.

In a possible implementation, determining the degree of association between the second region and the first region based on the customer counting result for the first region and the customer counting result for the second region includes: determining one or more target persons in both the first region and the second region based on the customer counting result for the first region and the customer counting result for the second region; and determining the degree of association between the second region and the first region based on the number of the one or more target persons, the customer counting result for the first region and the customer counting result for the second region.

In a possible implementation, the method further includes: sending the degree of association between the second region and the first region to a terminal device, such that the terminal device displays the degree of association between the second region and the first region on a first interface.

In a possible implementation, the method further includes: ranking degrees of associations between N region pairs formed by a plurality of regions in the target site to obtain a ranking result, where the N region pairs include a region pair formed by the first region and the second region; and presenting M region pairs having top-M degrees of associations in the ranking result, or sending the M region pairs having top-M degrees of associations in the ranking result to a terminal device, where M is a positive integer less than N.

In a possible implementation, the method further includes: obtaining a region arrangement analysis result for a plurality of regions in the target site based on degrees of associations between N region pairs formed by the plurality of regions, where the N is a positive integer; and presenting the region arrangement analysis result, or sending the region arrangement analysis result to a terminal device.

In a possible implementation, performing pedestrian identification processing on the plurality of video images to obtain, based on the identification result, the customer counting result for the first region in the target site and the customer counting result for the second region in the target site includes: obtaining a plurality of first images of the first region included in the plurality of video images; for each of the plurality of first images, performing human face tracking and/or human body tracking on the first image to obtain a human face tracking result and/or human body tracking result for the first image, obtaining a pedestrian identification result for the first image based on the human face tracking result and/or human body tracking result for the first image; and obtaining the customer counting result for the first region based on the pedestrian identification result for each of the plurality of first images of the first region.

In a possible implementation, obtaining the pedestrian identification result for the first image based on the human face tracking result and/or human body tracking result for the first image includes: in response to a human body image corresponding to the human body tracking result satisfying a predetermined condition, obtaining the pedestrian identification result based on human body image information corresponding to the human body tracking result; and/or in response to the human body image corresponding to the human body tracking result not satisfying the predetermined condition, obtaining the pedestrian identification result based on human face image information corresponding to the human face tracking result.

In a possible implementation, obtaining the pedestrian identification result based on human body image information corresponding to the human body tracking result includes: determining whether a human body template matching the human body image information exists in a human body template database; in response to determining that the human body template matching the human body image information exists in the human body template database, using a pedestrian identifier corresponding to the human body template as the pedestrian identification result; and/or in response to determining that the human body template matching the human body image information does not exist in the human body template database, using a newly added pedestrian identifier as the pedestrian identification result.

In a possible implementation, the method further includes: in response to determining that the human body template matching the human body image information exists in the human body template database, determining a human body identifier corresponding to the human body template; using a pedestrian identifier corresponding to the human body identifier in an association database as the pedestrian identifier corresponding to the human body template, where the association database is configured to store an association relationship between a predetermined human body identifier and a predetermined pedestrian identifier.

In a possible implementation, the method further includes: in response to determining that the human body template matching the human body image information does not exist in the human body template database, adding a human body template corresponding to the human body image information to the human body template database.

In a possible implementation, obtaining the pedestrian identification result based on human face image information corresponding to the human face tracking result includes: determining whether a human face template matching the human face image information exists in a human face template database; in response to determining that the human face template matching the human face image information exists in the human face template database, using a pedestrian identifier corresponding to the human face template as the pedestrian identification result; and/or in response to determining that the human face template matching the human face image information does not exist in the human face template database, using a newly added pedestrian identifier as the pedestrian identification result.

In a possible implementation, the method further includes: in response to determining that the human face template matching the human face image information does not exist in the human face template database, adding a human face template corresponding to the human face image information to the human face template database.

In a possible implementation, the method further includes: receiving a query request sent by a terminal device, where the query request includes a query condition; determining the degree of association between the second region and the first region includes: determining the degree of association between the second region and the first region based on the query condition.

In the second aspect, examples of the present disclosure provide a data processing method applied to a terminal device, which includes: receiving a degree of association between a first region and a second region both in a target site; and displaying the degree of association between the first region and the second region on a first interface; where the degree of association between the first region and the second region is determined based on a plurality of video images of the target site within a predetermined time range.

In a possible implementation, the method further includes: receiving a ranking result for degrees of associations between N region pairs formed by a plurality of regions in the target site, where the N region pairs include a region pair formed by the first region and the second region; and displaying M region pairs having top-M degrees of associations in the ranking result, where M is a positive integer less than N.

In a possible implementation, the method further includes: receiving a region arrangement analysis result for a plurality of regions in the target site; and displaying the region arrangement analysis result.

In a possible implementation, the method further includes: obtaining a query condition; sending a query request based on the query condition; and receiving the degree of association between the first region and the second region determined based on the query condition.

In the third aspect, examples of the present disclosure provides a data processing apparatus, which includes: an obtaining module, configured to obtain a plurality of video images of a target site within a predetermined time range; a counting module, configured to perform pedestrian identification processing on the plurality of video images to obtain, based on the identification result, a customer counting result for a first region in the target site and a customer counting result for a second region in the target site; and a processing module, configured to determine a degree of association between the second region and the first region based on the customer counting result for the first region and the customer counting result for the second region.

In a possible implementation, the processing module is configured to: determine one or more target persons in both the first region and the second region based on the customer counting result for the first region and the customer counting result for the second region; and determine the degree of association between the second region and the first region based on the number of the one or more target persons, the customer counting result for the first region and the customer counting result for the second region.

In a possible implementation, the processing module is further configured to: send the degree of association between the second region and the first region to a terminal device, such that the terminal device displays the degree of association between the second region and the first region on a first interface.

In a possible implementation, the processing module is further configured to: rank degrees of associations between N region pairs formed by a plurality of regions in the target site to obtain a ranking result, where the N region pairs include a region pair formed by the first region and the second region; and present M region pairs having top-M degrees of associations in the ranking result, or send the M region pairs having top-M degrees of associations in the ranking result to a terminal device, where M is a positive integer less than N.

In a possible implementation, the processing module is further configured to: obtain a region arrangement analysis result for a plurality of regions in the target site based on degrees of associations between N region pairs formed by the plurality of regions, where the N is a positive integer; and present the region arrangement analysis result, or send the region arrangement analysis result to a terminal device.

In a possible implementation, the counting module is configured to: obtain a plurality of first images of the first region included in the plurality of video images; for each of the plurality of first images, perform human face tracking and/or human body tracking on the first image to obtain a human face tracking result and/or human body tracking result for the first image; obtain a pedestrian identification result for the first image based on the human face tracking result and/or human body tracking result for the first image; and obtain the customer counting result for the first region based on the pedestrian identification result for each of the plurality of first images of the first region.

In a possible implementation, the counting module is configured to: in response to a human body image corresponding to the human body tracking result satisfying a predetermined condition, obtain the pedestrian identification result based on human body image information corresponding to the human body tracking result; and/or in response to the human body image corresponding to the human body tracking result not satisfying the predetermined condition, obtain the pedestrian identification result based on human face image information corresponding to the human face tracking result.

In a possible implementation, the counting module is configured to: determine whether a human body template matching the human body image information exists in a human body template database; in response to determining that the human body template matching the human body image information exists in the human body template database, use a pedestrian identifier corresponding to the human body template as the pedestrian identification result; and/or in response to determining that the human body template matching the human body image information does not exist in the human body template database, use a newly added pedestrian identifier as the pedestrian identification result.

In a possible implementation, the counting module is further configured to: in response to determining that the human body template matching the human body image information exists in the human body template database, determine a human body identifier corresponding to the human body template; use a pedestrian identifier corresponding to the human body identifier in an association database as the pedestrian identifier corresponding to the human body template, where the association database is configured to store an association relationship between a predetermined human body identifier and a predetermined pedestrian identifier.

In a possible implementation, the counting module is further configured to: in response to determining that the human body template matching the human body image information does not exist in the human body template database, add a human body template corresponding to the human body image information to the human body template database.

In a possible implementation, the counting module is further configured to: determine whether a human face template matching the human face image information exists in a human face template database; in response to determining that the human face template matching the human face image information exists in the human face template database, use a pedestrian identifier corresponding to the human face template as the pedestrian identification result; and/or in response to determining that the human face template matching the human face image information does not exist in the human face template database, use a newly added pedestrian identifier as the pedestrian identification result.

In a possible implementation, the counting module is further configured to: in response to determining that the human face template matching the human face image information does not exist in the human face template database, add a human face template corresponding to the human face image information to the human face template database.

In a possible implementation, the apparatus further includes: a receiving module, configured to receive a query request sent by a terminal device, where the query request includes a query condition; the processing module is further configured to: determine the degree of association between the second region and the first region based on the query condition.

In the fourth aspect, examples of the present disclosure provide a data processing apparatus applied to a terminal device, which includes: a communication module, configured to receive a degree of association between a first region and a second region both in a target site; and a display module, configured to display the degree of association between the first region and the second region on a first interface; where the degree of association between the first region and the second region is determined based on a plurality of video images of the target site within a predetermined time range.

In a possible implementation, the communication module is further configured to: receive a ranking result for degrees of associations between N region pairs formed by a plurality of regions in the target site, where the N region pairs include a region pair formed by the first region and the second region; and display M region pairs having top-M degrees of associations in the ranking result, where M is a positive integer less than N.

In a possible implementation, the communication module is further configured to receive a region arrangement analysis result for a plurality of regions in the target site; and the display module is further configured to display the region arrangement analysis result.

In a possible implementation, the apparatus further includes: an input module, configured to obtain a query condition; the communication module, configured to send a query request based on the query condition; and receive the degree of association between the first region and the second region determined based on the query condition.

In the fifth aspect, examples of the present disclosure provide a data processing apparatus, which includes: a memory, a processor, and a computer program stored on the memory and executable on the processor; where when the computer program is executed by the processor, steps of the data processing method according to the first aspect or the second aspect are implemented.

In the sixth aspect, examples of the present disclosure provide a computer storage medium storing a computer program, when the computer program is executed by a processor, the processor is caused to perform steps of the data processing method according to the first aspect or the second aspect.

In the seventh aspect, examples of the present disclosure provide a computer program, where the computer program causes a computer to perform the data processing method according to the first aspect or the second aspect.

In the technical solution provided in the present disclosure, a plurality of video images of a target site within a predetermined time range are obtained; pedestrian identification processing is performed on the plurality of video images to obtain, based on the identification result, a customer counting result for a first region in the target site and a customer counting result for a second region in the target site; and a degree of association between the second region and the first region is determined based on the customer counting result for the first region and the customer counting result for the second region. In this way, compared with manually determining the degree of association between the two regions in the target site, in the present disclosure, the degree of association between the regions within the predetermined time range can be determined quickly, thereby saving time and labor cost. In addition, since there is a relatively large error in determining the degree of association between regions by manually observing the number of customers, in the present disclosure, the degree of association between regions is determined by analyzing video images, thereby improving the accuracy of the determined degree of association.

DETAILED DESCRIPTION OF THE EMBODIMENTS

To make a person skilled in the art better understand technical solutions provided by the embodiments of the present disclosure, the technical solutions in the embodiments of the present disclosure will be clearly described below with reference to the accompanying drawings in the embodiments of the present disclosure. Apparently, the embodiments described are merely some embodiments of the present disclosure, and not all embodiments.

The terms "first," "second," and "third," etc. in the description embodiments and claims of the present disclosure and the above drawings are used to distinguish similar objects, and are not used to describe a particular order or sequence. Moreover, the terms "comprising/including" and "having" and any variation thereof, are intended to cover non-exclusive inclusion, e. g., the inclusion of a series of steps or units. The method, system, product or device are not limited to those steps or units that are explicitly listed, but may include other steps or units that are not explicitly listed or that are inherent to the process, method, product or device.

Figure 1:
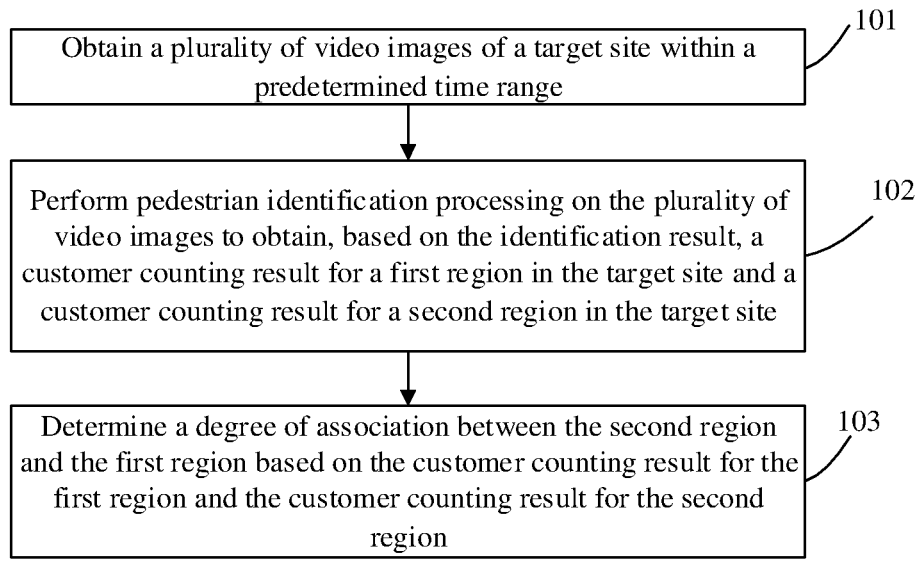
FIG. 1 is a first schematic flowchart of a data processing method provided by examples of the present disclosure.

Examples of the present disclosure provide a data processing method, which may be applied to a variety of electronic devices, including, but not limited to, fixed devices and/or mobile devices. For example, the fixed devices include, but not limited to: a personal computer (Personal Computer, PC), or a server, etc. The mobile devices include, but not limited to: a mobile phone, a tablet computer or a wearable device. As shown in FIG. 1, the method includes steps 101-103.

At step 101, a plurality of video images of a target site within a predetermined time range are obtained.

In examples of the present disclosure, the target site includes, but not limited to, a shopping mall or a supermarket, and may include any other type of public sites.

In examples of the present disclosure, the predetermined time range includes a start time and an end time, such as a day, a week, etc. The predetermined time range can be determined based on actual requirements, which is not limited in examples of the present disclosure. It should be noted that the end time cannot be later than a current time.

In examples of the present disclosure, the video images are captured by an image acquisition device (such as a camera or an image capture machine) installed in each region of the target site.

In examples of the present disclosure, the video images can be obtained in multiple ways. For example, the video images transmitted by the image acquisition device can be received, or the video images transmitted by other devices can be received by a communicator, and the video images transmitted by other devices may be captured by the image acquisition device.

At step 102, pedestrian identification processing is performed on the plurality of video images to obtain, based on the identification result, a customer counting result for a first region in the target site and a customer counting result for a second region in the target site.

In examples of the present disclosure, the target site may include a plurality of regions, and the first region and the second region may be any two of the plurality of regions included in the target site.

In some alternative implementations of the present disclosure, performing pedestrian identification processing on the plurality of video images to obtain, based on the identification result, a customer counting result for the first region in the target site and a customer counting result for the second region in the target site includes: obtaining a plurality of first images of the first region included in the plurality of video images; for each of the plurality of first images, performing human face tracking and/or human body tracking on the first image to obtain a human face tracking result and/or human body tracking result for the first image, obtaining a pedestrian identification result for the first image based on the human face tracking result and/or human body tracking result for the first image; and obtaining the customer counting result for the first region based on the pedestrian identification result for each of the plurality of first images of the first region.

In the examples, pedestrian detection can be performed on the image to obtain at least one pedestrian bounding box in the image; and for each pedestrian bounding box, human face tracking and/or human body tracking is performed based on the pedestrian bounding box to obtain a human face tracking result and/or a human body tracking result; and a pedestrian identification result is obtained based on at least one of the human face tracking result or the human body tracking result.

In this way, compared with customer counting by manually observing real pedestrians (walkers) through naked eyes, in the present disclosure, customer counting is completed by performing human body identification and/or human face identification on acquired pedestrian images, and a large number of images can be processed in a relatively short time, thereby improving statistics efficiency and saving human resources.

In the examples, the image may be subjected to image identification processing by any human face identification technology to obtain a human face feature identification result for the image. The examples of the present disclosure do not specifically define the human face identification technology.

In the examples, the image may be subjected to image identification processing by any human body identification technology to obtain a human body feature identification result for the image. The examples of the present disclosure do not specifically define the human body identification technology.

In some alternative examples of the present disclosure, obtaining the pedestrian identification result for the first image based on the human face tracking result and/or human body tracking result for the first image includes: in response to a human body image corresponding to the human body tracking result satisfying a predetermined condition, obtaining the pedestrian identification result based on human body image information corresponding to the human body tracking result; and/or in response to the human body image corresponding to the human body tracking result not satisfying the predetermined condition, obtaining the pedestrian identification result based on human face image information corresponding to the human face tracking result. The human face image information includes feature information of the human face image and/or the human face image. The human body image information includes feature information of the human body image and/or the human body image.

In some alternative examples, the predetermined condition may include: the quality of the human body image satisfies the predetermined quality requirement, for example, the predetermined quality requirement includes any one or more of the human face clarity satisfying the predetermined clarity requirement, the human face size satisfying the predetermined size requirement, the human face angle satisfying the predetermined angle requirement, the human face detection confidence (i.e., degree of confidence) satisfying the predetermined confidence requirement, the human body detection confidence satisfying the predetermined confidence requirement, or the human face integrity satisfying the predetermined human face integrity requirement.

In this way, when performing pedestrian identification, the human body identification result is analyzed first. If the human body identification result cannot be identified, then the human face identification result is analyzed. Since human body identification is easier and has shorter time-consumption than the human face identification, and the pedestrian identification result is obtained by combining the human body identification and the human face identification, misidentification due to factors such as human face angle or occlusion can be avoided, and identification efficiency can be improved, thereby improving customer counting efficiency.

In some alternative examples of the present disclosure, obtaining the pedestrian identification result based on human body image information corresponding to the human body tracking result includes: determining whether a human body template matching the human body image information exists in a human body template database; in response to determining that the matched human body template exists in the human body template database, using a pedestrian identifier corresponding to the matched human body template as the pedestrian identification result; and/or in response to determining that the matched human body template does not exist in the human body template database, using a newly added pedestrian identifier as the pedestrian identification result.

In some examples, a similarity between a human body feature of an image and a reference human body feature included in at least one human body template stored in the human body template database may be determined, and it is determined whether a human body template matching the image exists in the human body template database based on whether the similarity is greater than or equal to a predetermined threshold exists. However, the examples of the present disclosure are not limited thereto. For example, if the human body template database includes a human body template, and the similarity between the reference human body feature included in the human body template and the human body feature of the image is greater than or equal to the predetermined threshold, it may be determined that the human body template matching the image exists in the human body template database. On the contrary, if for each of human body templates in the human body template database, the similarity between the reference human body feature included in the human body template and the human body feature of the image is less than the predetermined threshold, it may be determined that the human body template matching the image does not exist in the human body template database.

In the examples, a plurality of human body templates may be stored in the human body template database, each human body template includes the corresponding reference human body feature and the corresponding pedestrian identifier. The pedestrian identifier may be used to represent a pedestrian corresponding to the reference human feature (or the human body template). In an example, a pedestrian identifier may be configured for each human body template in the human body template database, the pedestrian identifier may be a serial number, and the serial number may uniquely identify a corresponding human body template in the human body template database.

In some alternative examples of the present disclosure, the method further includes: in response to determining that the matched human body template exists in the human body template database, determining a human body identifier corresponding to the matched human body template; and using a pedestrian identifier corresponding to the human body identifier in an association database as the pedestrian identifier corresponding to the matched human body template. The associated database is used to store an association relationship between a predetermined human body identifier and a predetermined human identifier (i.e., pedestrian identifier).

In this way, the pedestrian identifier corresponding to the human body template can be supplemented by using the association relationship stored in the association database, and thus the analysis and refinement of the pedestrian can be improved.

In some alternative examples of the present disclosure, the method further includes: in response to determining that the matched human body template does not exist in the human body template database, adding a human body template corresponding to the human body image information to the human body template database.

In the examples, if the matched human body template does not exist in the human body template database, the human body template corresponding to the human body image information may be added to the human body template database. In an example, the human body feature corresponding to the human body image information may be taken as a human body template, the human body template may be added to the human body template database, and a new pedestrian identifier can be assigned to the added human body template.

In this way, if the matched human body template does not exist in the human body template database, the human body template corresponding to the human body image information is added to the human body template database, and thus data can be supplemented to the human body template database. When the customer accesses again, subsequent query is facilitated.

In some alternative examples of the present disclosure, obtaining the pedestrian identification result based on human face image information corresponding to the human face tracking result includes: determining whether a human face template matching the human face image information exists in a human face template database; in response to determining that the matched human face template exists in the human face template database, using a pedestrian identifier corresponding to the matched human face template as the pedestrian identification result; and/or in response to determining that the matched human face template does not exist in the human face template database, using a newly added pedestrian identifier as the pedestrian identification result.

In some examples, a similarity between a human face feature of an image and a reference human face feature included in at least one human face template stored in the human face template database may be determined, and it is determined whether a human face template matching the image exists in the human face template database based on whether the similarity is greater than or equal to a predetermined threshold exists. However, the examples of the present disclosure are not limited thereto. For example, if the human face template database includes a human face template, and the similarity between the reference human face feature included in the human face template and the human face feature of the image is greater than or equal to the predetermined threshold, it may be determined that the human face template matching the image exists in the human face template database. On the contrary, if for each of human face templates in the human face template database, the similarity between the reference human face feature included in the human face template and the human face feature of the image is less than the predetermined threshold, it may be determined that the human face template matching the image does not exist in the human face template database.

In the examples, multiple human face templates can be stored in the human face template database. Each human face template includes the corresponding reference human face feature and the corresponding pedestrian identifier. The pedestrian identifier may be used to represent a pedestrian corresponding to the reference human face feature (or the human face template). In an example, a pedestrian identifier may be configured for each human face template in the human face template database. The pedestrian identifier may be a serial number, which can uniquely identify a corresponding human face template in the human face template database.

In some alternative examples of the present disclosure, the method further includes: in response to determining that the matched human face template does not exist in the human face template database, adding a human face template corresponding to the human face image information to the human face template database.

In the examples, if the matched human face template does not exist in the human face template database, the human face template corresponding to the human face image information may be added to the human face template database. In an example, the human face feature corresponding to the human face image information may be taken as a human face template, the human face template may be added to the human face template database, and a new pedestrian identifier can be assigned to the added human face template.

In this way, if the matched human face template does not exist in the human face template database, the human face template corresponding to the human face image information is added to the human face template database, and thus data can be supplemented to the human face template database. When the customer accesses again, subsequent query is facilitated.

At step 103, the degree of association between the second region and the first region is determined based on the customer counting result for the first region and the customer counting result for the second region.

In some alternative examples of the present disclosure, the degree of association between the first region and the second region may be determined with the following formula:

$$\text{the degree of association between region } A \text{ and region } B = \frac{\text{the number of customers who have been to both region } A \text{ and region } B}{\text{the number of customers who have been to region } B} \times 100\% \quad (1)$$

In some alternative examples of the present disclosure, the degree of association between the first region and the second region may be determined with the following formula:

$$\text{the degree of association between region } A \text{ and region } B = \frac{\text{the number of customers who have been to both region } A \text{ and region } B}{\text{the number of customers who have been to region } B} \times 100\% \quad (2)$$

Examples of the present disclosure does not mandatorily define the calculation formula of the degree of association. It should be noted that, when determining the degree of association between the first region and the second region, several bits after the decimal point may be reserved. Regarding the specific bits after the decimal point, the configuration or adjustment may be performed according to the precision requirements.

In this way, compared with by users manually recording or inferring the degree of association between regions, in the present disclosure, by automatically identifying pedestrians to determine customer counting results, the degree of association is determined based on the customer counting results. It is convenient, saves the time and effort of the persons, and facilitates the users to perform targeted work and service based on the analysis result for the degree of association, thereby improving customer experience and sale conversion rate.

In some alternative examples of the present disclosure, determining the degree of association between the second region and the first region based on the customer counting result for the first region and the customer counting result for the second region includes: determining one or more target persons in both the first region and the second region based on the customer counting result for the first region and the customer counting result for the second region; and determining the degree of association between the second region and the first region based on the number of the one or more target persons, the customer counting result for the first region and the customer counting result for the second region.

In some alternative examples, the degree of association between the second region and the first region is equal to a quotient obtained by dividing the number of target persons to the number of customers in the customer counting result for the first region. In other alternative examples, the degree of association between the second region and the first region is equal to a quotient obtained by dividing the number of target persons to the number of customers in the customer counting result for the second region.

In this way, it is convenient to determine the degree of association between each region in the target site through the customer counting results.

In some alternative examples of the present disclosure, the method further includes sending the degree of association between the second region and the first region to a terminal device, such that the terminal device displays the degree of association between the second region and the first region on a first interface.

In this way, the degree of association between the second region and the first region can be fed back to the terminal device in time, thereby facilitating the user to know the degree of association between the second region and the first region in time. Based on the result for the degree of association between regions, the types of the commodities in the store can be increased, and the commodities for sale can also be personalized according to the result for the degree of association between different regions, so as to add the number of customers and sale revenue to the merchant.

In some alternative examples of the present disclosure, the method further includes: ranking degrees of associations between N region pairs formed by a plurality of regions in the target site to obtain a ranking result, where the N region pairs include a region pair formed by the first region and the second region; presenting M region pairs having top-M degrees of associations in the ranking result, or sending M region pairs having top-M degrees of associations in the ranking result, where M is a positive integer less than N.

In some examples, taking the target site being a shopping mall as an example, each store in the shopping mall is regions included in the target site, the degrees of associations between each store in the shopping mall are determined, and the degrees of associations are ranked. In this way, the degrees of associations between one store and other stores can be determined to obtain one or more stores which have top association with the store. Of course, several pairs of stores with top association can also be selected through the degrees of associations.

In this way, by determining the degree of association between each region pair, which two regions have a top degree of association can be determined. By sending the ranking results of degrees of associations to the terminal device, it is convenient for the user to know the degree of association between regions in time, and then to perform targeted work and service based on the analysis result for degree of association, thus improving the customer experience and sales conversion rate.

In some examples, for shopping malls, the degree of association between regions is used to associate two seemingly unrelated merchants. The locations of the entrance and the exit of the shopping mall and the layout of the store in the shopping mall may be changed based on the result for degree of association, so as to improve the number of customers of the shopping mall and sales of the store.

For example, for marketers, the result for degree of association between regions is used to perform joint marketing on two seemingly unrelated merchants, thereby making the effect of 1+1>2.

For example, for merchants, based on the result for the degree of association between regions, the types of the commodities in the store can be increased, and the commodities for sale can also be personalized according to the result for the degree of association between different regions, so as to add the number of customers and sale revenue to the merchant.

In some alternative examples of the present disclosure, the method further includes: obtaining a region arrangement analysis result for a plurality of regions in the target site based on degrees of associations between N region pairs formed by the plurality of regions, where the N is a positive integer; and presenting the region arrangement analysis result, or sending the region arrangement analysis result to a terminal device.

The region arrangement analysis result includes at least one of the following information: a current region association degree summary (for example, which regions have a higher degree of association, which regions have a lower degree of association, etc.); or layout regulations (for example, which types of regions are arranged more suitable or unsuitable together); or layout improvement recommendation (for example, the positions of which regions are adjusted).

In this way, the region arrangement analysis result for the plurality of regions in the target site is provided to facilitate a user to perform targeted work and service with reference to the association arrangement analysis result, thereby improving customer experience and sales conversion rate.

In some alternative examples of the present disclosure, the method further includes: receiving a query request sent by a terminal device, the query request including a query condition. Determining the degree of association between the second region and the first region includes: based on the query condition, determining the degree of association between the second region and the first region. The query condition includes dividing information of the first region and at least one second region, and the query condition may further include the predetermined time range information.

In this way, the degree of association matching the query condition input by the user can be fed back to the terminal device in time, such that the user knows the degree of association between the second region and the first region in time.

The first and second regions are located within the same target site. For example, the first region and the second region are located in the same shopping mall. For example, the first region and the second region are located on the same floor of the shopping mall. The first region is the target region of the user, and the second region is another region set by the user except the target region. Alternatively, the first region and the second region are different regions of the same store, and the division of regions can be set according to the user's needs, which is not limited in examples of the present disclosure.

In an example, there are two floors in a shopping mall, the first floor including p stores and the second floor including q stores; the p stores are marked as F1, F2, ..., Fp; and the q stores are marked as S1, S2, ..., Sq. The region at which the store F1 is located is determined as the first region, the region at which the store F2 is located as the second region, the region at which the store F3 is located as the second region, and the region at which the store F0 is located as the second region, that is, the degrees of associations between the respective stores F2, F3, F0 to the store F1 need to be determined. The region at which the store S1 is located is determined as the first region and the region at which the store S5 is located is determined as the second region, that is, the degree of association between the store S5 to the store S1 needs to be determined.

In some examples, the above method can be performed by a server. The server can be a cloud server and/or a front-end server. For example, the above method is implemented by a front-end server (such as a video integrated machine) and a cloud server. The front-end server performs human face tracking and human body tracking on the first image to obtain the human face tracking result and the human body tracking result; determines which image information to perform pedestrian identification based on the quality of human face image and/or human body image; and then sends the determined image information to the cloud server. After receiving the image information sent by the front-end server, the cloud server queries a corresponding database based on the received image information, obtains a pedestrian identification result, and sends a corresponding processing result to the terminal device, but the examples of the present disclosure do not limit thereto.

Figure 2:
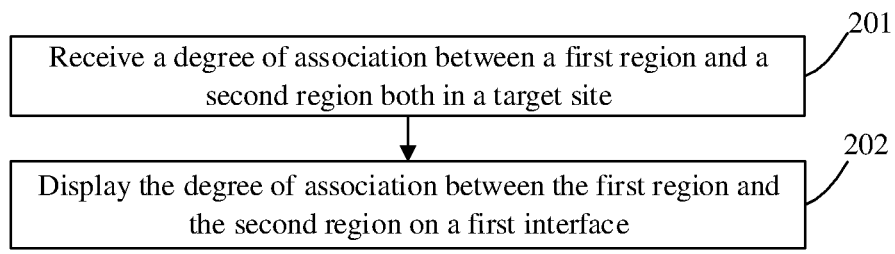
FIG. 2 is a second schematic flowchart of a data processing method provided by examples of the present disclosure.

Examples of the present disclosure further provides a data processing method applied to a terminal device. As shown in FIG. 2, the method includes steps 201-202.

At step 201, a degree of association between a first region and a second region both in a target site is received.

The degree of association between the first region and the second region is determined based on a plurality of video images of the target site within a predetermined time range.

At step 202, the degree of association between the first region and the second region is displayed on a first interface.

In this way, the degree of association between the second region and the first region can be provided for the terminal device, which is helpful for the user to perform targeted work and service according to the degree of association between regions, thereby improving customer experience and sales conversion rate.

In some alternative examples of the present disclosure, the method further includes: obtaining a query condition; sending a query request based on the query condition; and receiving the degree of association between the second region and the first region determined based on the query condition. The query condition may include dividing information of the first region and the second region, as well as the predetermined time range information.

In this way, the degree of association satisfying the query condition can be provided for the terminal device, which is helpful for the user to perform targeted work and service according to the degree of association between regions, thereby improving customer experience and sales conversion rate.

In some alternative examples of the present disclosure, the method further includes: receiving a ranking result for degrees of associations between N region pairs formed by a plurality of regions in the target site, where the N region pairs include a region pair formed by the first region and the second region; displaying M region pairs having top-M degrees of associations in the ranking result, where M is a positive integer less than N.

In this way, by feedback the ranking result for degrees of associations to the terminal device, it is convenient for the user to know the degree of association between regions in time, and then facilitate the user to perform targeted work and service according to the analysis result for the degree of association, thereby improving customer experience and sales conversion rate.

In some alternative examples of the present disclosure, the method further includes receiving a region arrangement analysis result for a plurality of regions in the target site, and displaying the region arrangement analysis result.

In this way, the region arrangement analysis result can be fed back to the terminal device, and it can be convenient for users to perform targeted work and service with reference to the association arrangement analysis result, thereby improving customer experience and sales conversion rate.

Figure 3:
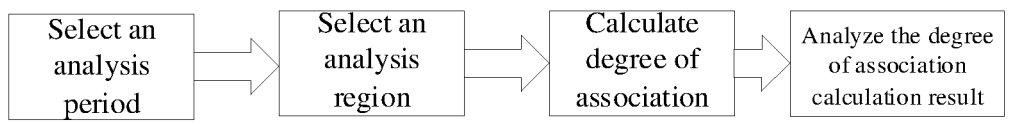
FIG. 3 is a schematic flowchart for a process of determining the degree of associations between regions provided by examples of the present disclosure.

FIG. 3 shows a schematic flowchart for a process of determining the degree of associations between regions. As shown in FIG. 3, the process includes: selecting an analysis period, selecting an analysis region, calculating degree of association, and analyzing the result for degree of association.

In some examples, selecting an analysis period includes: selecting a time range (i.e., the above predetermined time range) for calculating the degree of association. The minimum time length is one day, or any period of time is selected before the day.

In some examples, selecting an analysis region includes: selecting regions that wants to calculate the degree of association, and dividing and defining the regions.

For example, visiting/accessing store A refers to entering store A and resides in store A for more than X minutes. Visiting/accessing a large screen of the shopping mall refers to facing the large screen beyond Y seconds within a determined range in front of the large screen. In this way, the accuracy of the region division can be improved compared with the region roughly determined by the naked eyes.

In some examples, calculating degree of association includes: calculating degree of association with following formulas:

if the time range is one day, $$\text{the degree of association between region } A \text{ and region } B = \frac{\text{the number of customers who have been to both region } A \text{ and region } B}{\text{the number of customers who have been to region } B} \times 100\%;$$

and
if the time range exceeds one day, $$\text{the degree of association between region } A \text{ and region } B = \frac{\text{the number of cumulative customers who have been to both region } A \text{ and region } B}{\text{the number of customers who have been to region } B} \times 100\%.$$

In some examples, the above degree of association may reserve two bits after a decimal point (such as 85.38%).

In some examples, analyzing the result for degree of association includes: after calculating the degrees of associations between all regions, for a designated region, the degree of association result for other regions to the designated region is ranked in a descending order; and analyzing which two regions have a high degree of association to perform further analysis and layout.

It should be understood that the process of determining the degree of association shown in FIG. 3 is an alternative detailed implementation, but not limited to this.

It should also be understood that the process of determining the degree of association shown in FIG. 3 is merely for illustrating the embodiments of the present disclosure, and various obvious changes and/or replacements can be made by those skilled in the art based on the example shown in FIG. 3, and the obtained technical solution still belongs to the disclosed scope of the embodiments of the present disclosure.

Figure 4:
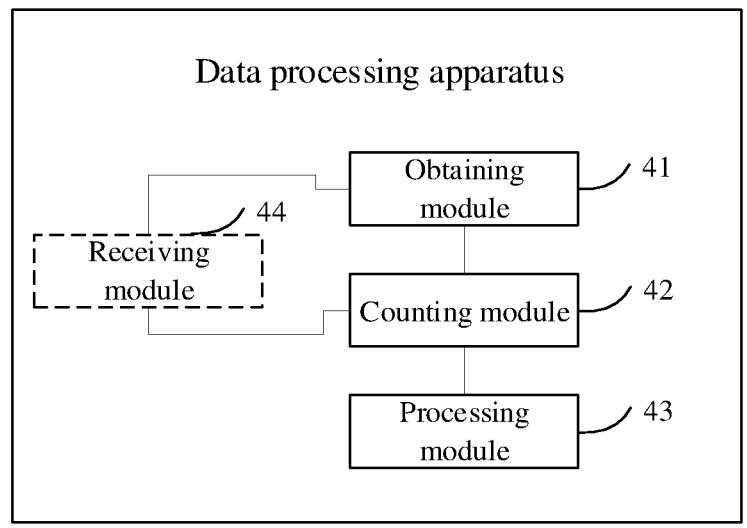
FIG. 4 is a first schematic diagram of a structure of a data processing apparatus provided by examples of the present disclosure.

Corresponding to the above data processing method, examples of the present disclosure provides a data processing apparatus. As shown in FIG. 4, the apparatus includes an obtaining module 41, configured to obtain a plurality of video images of a target site within a predetermined time range; a counting module 42, configured to perform pedestrian identification processing on the plurality of video images to obtain, based on the identification result, a customer counting result for a first region in the target site and a customer counting result for a second region in the target site; and a processing module 43, configured to determine a degree of association between the second region and the first region based on the customer counting result for the first region and the customer counting result for the second region.

In some examples, the processing module 43 is configured to: determine one or more target persons in both the first region and the second region based on the customer counting result for the first region and the customer counting result for the second region; and determine the degree of association between the second region and the first region based on the number of the one or more target persons, the customer counting result for the first region and the customer counting result for the second region.

In some examples, the processing module 43 is further configured to: send the degree of association between the second region and the first region to a terminal device, such that the terminal device displays the degree of association between the second region and the first region on a first interface.

In some examples, the processing module 43 is further configured to: rank degrees of associations between N region pairs formed by a plurality of regions in the target site to obtain a ranking result, where the N region pairs include a region pair formed by the first region and the second region; and present M region pairs having top-M degrees of associations in the ranking result, or send the M region pairs having top-M degrees of associations in the ranking result to a terminal device, where M is a positive integer less than N.

In some examples, the processing module 43 is further configured to: obtain a region arrangement analysis result for a plurality of regions in the target site based on degrees of associations between N region pairs formed by the plurality of regions, where the N is a positive integer; and present the region arrangement analysis result, or send the region arrangement analysis result to a terminal device.

In some examples, the counting module 42 is configured to: obtain a plurality of first images of the first region included in the plurality of video images; for each of the plurality of first images, perform human face tracking and/or human body tracking on the first image to obtain a human face tracking result and/or human body tracking result for the first image, obtain a pedestrian identification result for the first image based on the human face tracking result and/or human body tracking result for the first image; and obtain the customer counting result for the first region based on the pedestrian identification result for each of the plurality of first images of the first region.

In some examples, the counting module 42 is configured to: in response to a human body image corresponding to the human body tracking result satisfying a predetermined condition, obtain the pedestrian identification result based on human body image information corresponding to the human body tracking result; and/or in response to the human body image corresponding to the human body tracking result not satisfying the predetermined condition, obtain the pedestrian identification result based on human face image information corresponding to the human face tracking result.

In some examples, the counting module 42 is configured to: determine whether a human body template matching the human body image information exists in a human body template database; in response to determining that the human body template matching the human body image information exists in the human body template database, use a pedestrian identifier corresponding to the human body template as the pedestrian identification result; and/or in response to determining that the human body template matching the human body image information does not exist in the human body template database, use a newly added pedestrian identifier as the pedestrian identification result.

In some examples, the counting module 42 is further configured to: in response to determining that the human body template matching the human body image information exists in the human body template database, determine a human body identifier corresponding to the human body template; use a pedestrian identifier corresponding to the human body identifier in an association database as the pedestrian identifier corresponding to the human body template, where the association database is configured to store an association relationship between a predetermined human body identifier and a predetermined pedestrian identifier.

In some examples, the counting module 42 is further configured to: in response to determining that the human body template matching the human body image information does not exist in the human body template database, add a human body template corresponding to the human body image information to the human body template database.

In some examples, the counting module 42 is further configured to: determine whether a human face template matching the human face image information exists in a human face template database; in response to determining that the human face template matching the human face image information exists in the human face template database, use a pedestrian identifier corresponding to the human face template as the pedestrian identification result; and/or in response to determining that the human face template matching the human face image information does not exist in the human face template database, use a newly added pedestrian identifier as the pedestrian identification result.

In some examples, the counting module 42 is further configured to: in response to determining that the human face template matching the human face image information does not exist in the human face template database, add a human face template corresponding to the human face image information to the human face template database.

In some examples, the apparatus further includes: a receiving module 44, configured to receive a query request sent by a terminal device, where the query request includes a query condition; the processing module 43 is further configured to: determine the degree of association between the second region and the first region based on the query condition.

It should be understood by those skilled in the art that the implementation function of each processing module in the data processing apparatus shown in FIG. 4 may be understood with reference to the relevant description of the foregoing data processing method. It should be understood by those skilled in the art that the functions of each processing unit in the data processing apparatus shown in FIG. 4 may be implemented by a program running on a processor, and may also be implemented by a specific logic circuit.

In practice, the specific structures of the obtaining module 41, the counting module 42, the processing module 43 and the receiving module 44 may all correspond to a processor combined with a communication module. The specific structure of the processor may be an electronic component or a set of electronic components having a processing function, such as a central processing unit (CPU, Central Processing Unit), a microprocessor (MCU, Micro Controller Unit), a digital signal processor (DSP, Digital Signal Processing), or a programmable logic device (PLC, Programmable Logic Controller). The processor includes an executable code, where the executable code is stored in a storage medium, and the processor may be coupled to the storage medium through a communication interface such as a bus, and when a specific corresponding function of each unit is executed, the executable code is read from the storage medium and run. The part of the storage medium for storing the executable code is preferably a non-transitory storage medium.

The data processing apparatus provided by examples of the present disclosure can determine the degrees of associations between regions, which is helpful for a user to perform targeted work and service according to the degrees of associations between the regions, thereby improving customer experience and sales conversion rate.

Examples of the present disclosure further provides a data processing apparatus, the apparatus including a memory, a processor and a computer program stored in the memory and executable on the processor, where when the computer program is executed by the processor, the data processing method provided by any one of the foregoing technical solutions applied to the server is implemented.

Figure 5:
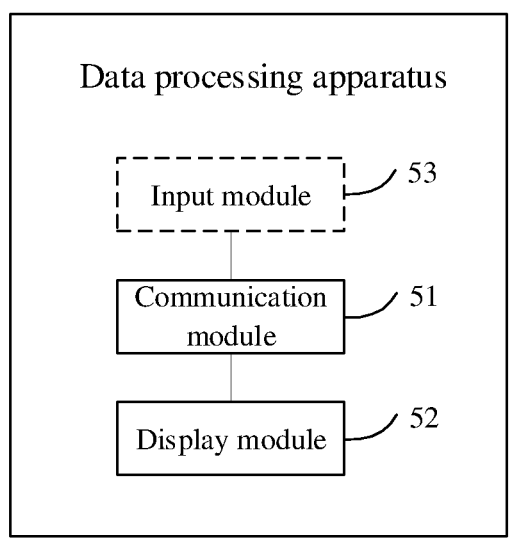
FIG. 5 is a second schematic diagram of a structure of a data processing apparatus provided by examples of the present disclosure.

Corresponding to the above data processing method, examples of the present disclosure further provide a data processing apparatus. As shown in FIG. 5, the apparatus includes a communication module 51, configured to receive a degree of association between a first region and a second region both in a target site; a display module 52, configured to display the degree of association between the first region and the second region on a first interface; where the degree of association between the first region and the second region is determined based on a plurality of video images of the target site within a predetermined time range.

In some examples, the communication module 51 is further configured to: receive a ranking result for degrees of associations between N region pairs formed by a plurality of regions in the target site, where the N region pairs include a region pair formed by the first region and the second region; and display M region pairs having top-M degrees of associations in the ranking result, where M is a positive integer less than N.

In some examples, the communication module 51 is further configured to receive a region arrangement analysis result for a plurality of regions in the target site; the display module 52 is further configured to display the region arrangement analysis result.

In some examples, the apparatus further includes an input module 53 configured to obtain a query condition; the communication module 51 is configured to send a query request based on the query condition; and receive the degree of association between the first region and the second region determined based on the query condition.

It should be understood by those skilled in the art that the implementation function of each processing module in the data processing apparatus shown in FIG. 5 may be understood with reference to the relevant description of the foregoing data processing method. It should be understood by those skilled in the art that the functions of each processing unit in the data processing apparatus shown in FIG. 5 may be implemented by a program running on a processor, and may also be implemented by a specific logic circuit.

In practice, the specific structures of the communication module 51, the display module 52 and the input module 53 may all correspond to a processor in combination with a communication module. The specific structure of the processor may be an electronic component or a set of electronic components having a processing function such as a CPU, an MCU, a DSP, or a PLC. The processor includes an executable code, where the executable code is stored in a storage medium, and the processor may be coupled to the storage medium through a communication interface such as a bus, and when a specific corresponding function of each unit is executed, the executable code is read from the storage medium and run. The part of the storage medium for storing the executable code is preferably a non-transitory storage medium.

The data processing apparatus provided by examples of the present disclosure can output the degrees of associations between regions satisfying the query condition, which is helpful for a user to perform targeted work and service according to the ranking result for the degrees of associations, thereby improving customer experience and sales conversion rate.

Figure 6:
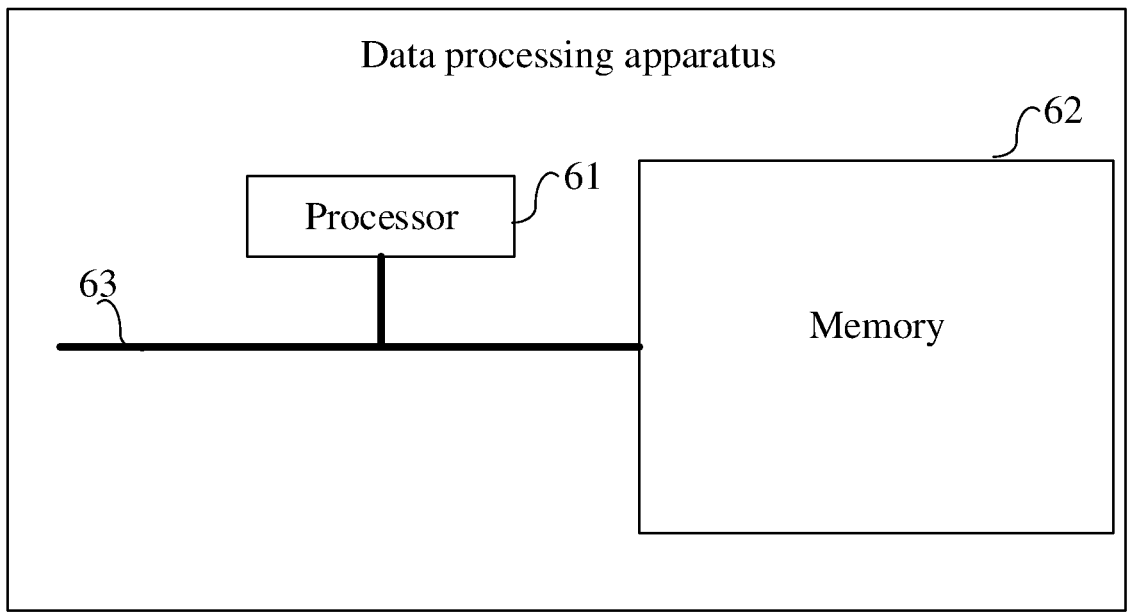
FIG. 6 is a schematic diagram of a hardware structure of a data processing apparatus provided by examples of the present disclosure.

Examples of the present disclosure further provide a data processing apparatus. FIG. 6 is a schematic diagram of a hardware structure of a data processing apparatus provides by examples of the present disclosure. As shown in FIG. 6, the apparatus includes a memory 62, a processor 61 and a computer program stored in the memory 62 and executable on the processor 61, where when the computer program is executed by the processor 61, the data processing method provided by any one of the foregoing technical solutions applied to an electronic device such as the server or the terminal device is implemented.

It is understood that the various components in the data processing apparatus may be coupled together by a bus system 63. It will be appreciated that the bus system 63 is used to implement connection communication between these components. The bus system 63 includes a power bus, a control bus, and a status signal bus in addition to the data bus. However, for clarity of illustration, various buses are denoted as bus system 63 in FIG. 6.

Examples of the present disclosure further provide a computer storage medium storing computer executable instructions. The computer executable instructions are configured to the data processing method described in the foregoing examples. That is, after the computer executable instructions are executed by the processor, the data processing method provided by any one of the foregoing technical solutions applied to an electronic device such as the server or the terminal device is implemented can be implemented.

It should be understood by those skilled in the art that the functions of each program in the computer storage medium of the examples of the present disclosure can be understood with reference to the relevant description of the data processing method described in the foregoing examples.

Examples of the present disclosure further provide a computer program. The computer program causes a computer to perform any one of the foregoing data processing methods applied to an electronic device such as the server or the terminal device.

The methods disclosed in the examples of the present disclosure may be applied to a processor or implemented by a processor. The processor may be an integrated circuit chip having a capability of processing signals. In the implementation process, each step of the above methods may be completed by an integrated logic circuit of hardware in the processor or an instruction in the form of software. The processor may be a general-purpose processor, a DSP, or other programmable logic device, a discrete gate or transistor logic device, a discrete hardware component, or the like. The processor may implement or execute the methods, steps and logical block diagrams disclosed in the examples of the present disclosure. The general-purpose processor may be a microprocessor or any conventional processor or the like. With reference to the steps of the methods disclosed in the examples of the present disclosure, it may be directly embodied that the execution is completed by the hardware decoding processor or a combination of the hardware in the decoding processor and software modules. The software module may be located in a storage medium, the storage medium is located in a memory, and the processor reads information in the memory, and completes the steps of the foregoing methods in conjunction with hardware thereof.

In several examples provided by the present disclosure, it should be understood that the disclosed apparatuses and methods may be implemented in other ways. The apparatus examples described above are merely schematic, for example, the division of the units is merely a logical function division, and there may be another division manner in actual implementation, for example, a plurality of units or components may be combined, or may be integrated into another system, or some features may be ignored or not performed. Moreover, the coupling, or direct coupling, or communication connection between the components shown or discussed may be through some interfaces. Indirect coupling or communication connection of devices or units may be electrical, mechanical, or other forms.

The units described as separate components may or may not be physically separate, and the components displayed as units may or may not be physical units. The components displayed as units may be located in one place or distributed to a plurality of network units. Some or all of the units may be selected according to actual needs to achieve the purpose of the examples of the present disclosure.

In addition, all the functional units in the examples of the present disclosure may be integrated into one processing unit, or each functional unit separately serves as one unit, or two or more functional units may be integrated into one unit. The integrated units may be implemented in the form of hardware or in the form of hardware and software function units.

Persons of ordinary skill in the art may understand that all or part of the steps of the foregoing method examples may be implemented by a program instructing relevant hardware. The foregoing program may be stored in a computer readable storage medium. When the program is executed, the steps of the foregoing method examples are executed. The foregoing storage medium includes various media that can store program codes, such as a removable storage device, a read-only memory (ROM, Read-Only Memory), a random access memory (RAM, Random Access Memory), a magnetic disk, or an optical disk.

Alternatively, if the integrated unit in the present disclosure is implemented in the form of a software function module and sold or used as an independent product, the integrated unit may also be stored in a computer readable storage medium. Based on such understanding, the technical solutions provided by the examples of the present disclosure may be embodied in the form of a software product in nature or part of the technical solutions that make a contribution to the prior art may be embodied in the form of a software product. The computer software product is stored in a storage medium and includes instructions to cause a computer device (which may be a personal computer, a server, or a network device, etc.) to perform all or part of the methods described in various examples of the present disclosure. The foregoing storage medium includes various media that can store program codes, such as a removable storage device, a ROM, a RAM, a magnetic disk, or an optical disk.

The foregoing description is merely a specific embodiment of the present disclosure, but the scope of protection of the present disclosure is not limited thereto, and any variation or replacement readily conceivable by a person skilled in the art within the technical scope disclosed in the present disclosure should belong to the scope of protection of the present disclosure. Therefore, the scope of protection of the present disclosure should be based on the scope of protection of said claims.

The invention claimed is:

1. A data processing method, comprising:
   obtaining a plurality of video images of a target site within a predetermined time range;
   performing pedestrian identification processing on the plurality of video images to obtain an identification result, and obtaining, based on the identification result, a first customer counting result for a first region in the target site and a second customer counting result for a second region in the target site; and
   determining a degree of association between the second region and the first region based on the first customer counting result for the first region and the second customer counting result for the second region;
   wherein performing pedestrian identification processing on the plurality of video images to obtain an identification result, and obtaining, based on the identification result, the first customer counting result for the first region in the target site and the second customer counting result for the second region in the target site comprises:
      obtaining a plurality of first images of the first region included in the plurality of video images;
      for each of the plurality of first images,
         performing human body tracking on the first image to obtain a human body tracking result for the first image;
         in response to a human body image corresponding to the human body tracking result satisfying a predetermined condition, obtaining a pedestrian identification result based on human body image information corresponding to the human body tracking result;
         in response to the human body image corresponding to the human body tracking result not satisfying the predetermined condition,
         performing human face tracking on the first image to obtain a human face tracking result for the first image, and
         obtaining a pedestrian identification result based on human face image information corresponding to the human face tracking result; and
      obtaining the first customer counting result for the first region based on the pedestrian identification result for each of the plurality of first images of the first region.

2. The method of claim 1, wherein determining the degree of association between the second region and the first region based on the first customer counting result for the first region and the second customer counting result for the second region comprises:
   determining one or more target persons in both the first region and the second region based on the first customer counting result for the first region and the second customer counting result for the second region; and
   determining the degree of association between the second region and the first region based on a number of the one or more target persons, the first customer counting result for the first region and the second customer counting result for the second region.

3. The method of claim 1, further comprising:
   sending the degree of association between the second region and the first region to a terminal device, such that the terminal device displays the degree of association between the second region and the first region on a first interface.

4. The method of claim 1, further comprising:
ranking degrees of associations between N region pairs formed by a plurality of regions in the target site to obtain a ranking result, wherein the N region pairs comprise a region pair formed by the first region and the second region, wherein N is a positive integer; and
presenting M region pairs having top-M degrees of associations in the ranking result, or sending the M region pairs having top-M degrees of associations in the ranking result to a terminal device, wherein M is a positive integer less than N.

5. The method of claim 1, further comprising:
obtaining a region arrangement analysis result for a plurality of regions in the target site based on degrees of associations between N region pairs formed by the plurality of regions, wherein N is a positive integer; and
presenting the region arrangement analysis result, or sending the region arrangement analysis result to a terminal device.

6. The method of claim 1, wherein obtaining the pedestrian identification result based on human body image information corresponding to the human body tracking result comprises:
determining whether a human body template matching the human body image information exists in a human body template database;
in response to determining that the human body template matching the human body image information exists in the human body template database, using a pedestrian identifier corresponding to the human body template as the pedestrian identification result; and/or
in response to determining that the human body template matching the human body image information does not exist in the human body template database, using a newly added pedestrian identifier as the pedestrian identification result.

7. The method of claim 6, further comprising:
in response to determining that the human body template matching the human body image information exists in the human body template database, determining a human body identifier corresponding to the human body template;
using a pedestrian identifier corresponding to the human body identifier in an association database as the pedestrian identifier corresponding to the human body template, wherein the association database is configured to store an association relationship between a predetermined human body identifier and a predetermined pedestrian identifier.

8. The method of claim 6, further comprising:
in response to determining that the human body template matching the human body image information does not exist in the human body template database, adding a human body template corresponding to the human body image information to the human body template database.

9. The method of claim 1, wherein obtaining the pedestrian identification result based on human face image information corresponding to the human face tracking result comprises:
determining whether a human face template matching the human face image information exists in a human face template database;

in response to determining that the human face template matching the human face image information exists in the human face template database, using a pedestrian identifier corresponding to the human face template as the pedestrian identification result; and/or
in response to determining that the human face template matching the human face image information does not exist in the human face template database, using a newly added pedestrian identifier as the pedestrian identification result.

10. The method of claim 9, further comprising:
in response to determining that the human face template matching the human face image information does not exist in the human face template database, adding a human face template corresponding to the human face image information to the human face template database.

11. The method of claim 1, further comprising:
receiving a query request sent by a terminal device, wherein the query request comprises a query condition;
determining the degree of association between the second region and the first region comprises:
determining the degree of association between the second region and the first region based on the query condition.

12. A data processing method applied to a terminal device, the method comprising:
receiving a degree of association between a first region and a second region both in a target site; and
displaying the degree of association between the first region and the second region on a first interface;
wherein the degree of association between the first region and the second region is determined by:
obtaining a plurality of video images of the target site within a predetermined time range;
performing pedestrian identification processing on the plurality of video images to obtain an identification result, and obtaining, based on the identification result, a first customer counting result for a first region in the target site and a second customer counting result for a second region in the target site; and
determining a degree of association between the second region and the first region based on the first customer counting result for the first region and the second customer counting result for the second region;
wherein performing pedestrian identification processing on the plurality of video images to obtain an identification result, and obtaining, based on the identification result, the first customer counting result for the first region in the target site and the second customer counting result for the second region in the target site comprises:
obtaining a plurality of first images of the first region included in the plurality of video images;
for each of the plurality of first images,
performing human body tracking on the first image to obtain a human body tracking result for the first image;
in response to a human body image corresponding to the human body tracking result satisfying a predetermined condition, obtaining a pedestrian identification result based on human body image information corresponding to the human body tracking result;

in response to the human body image corresponding to the human body tracking result not satisfying the predetermined condition, performing human face tracking on the first image to obtain a human face tracking result for the first image, and obtaining a pedestrian identification result based on human face image information corresponding to the human face tracking result; and obtaining the first customer counting result for the first region based on the pedestrian identification result for each of the plurality of first images of the first region.

13. The method of claim 12, further comprising:

receiving a ranking result for degrees of associations between N region pairs formed by a plurality of regions in the target site, wherein the N region pairs comprise a region pair formed by the first region and the second region, wherein N is a positive integer; and displaying M region pairs having top-M degrees of associations in the ranking result, wherein M is a positive integer less than N.

14. The method of claim 12, further comprising:

receiving a region arrangement analysis result for a plurality of regions in the target site; and displaying the region arrangement analysis result.

15. A data processing apparatus, comprising: a memory, a processor, and a computer program stored on the memory and executable on the processor;

wherein when the computer program is executed by the processor, the data processing method according to claim 1 is implemented.

16. A data processing apparatus, comprising: a memory, a processor, and a computer program stored on the memory and executable on the processor;

wherein when the computer program is executed by the processor, the data processing method according to claim 12 is implemented.

17. A non-transitory computer storage medium storing a computer program, when the computer program is executed by a processor, the processor is caused to perform the data processing method according to claim 1.

18. A non-transitory computer storage medium storing a computer program, when the computer program is executed by a processor, the processor is caused to perform the data processing method according to claim 12.

* * * * *